(12) United States Patent
Comar

(10) Patent No.: US 11,265,012 B1
(45) Date of Patent: Mar. 1, 2022

(54) METHODS OF SECURE COMMUNICATION USING LOW-DENSITY PARITY CHECK CODING

(71) Applicant: The Government of the United States as represented by the Director, National Security Agency, Ft. George G. Meade, MD (US)

(72) Inventor: Bradley B. Comar, Washington, DC (US)

(73) Assignee: U.S. Government as represented by the Director, National Security Agency, Washington, DC (US)

( * ) Notice: Subject to any disclaimer, the term of this patent is extended or adjusted under 35 U.S.C. 154(b) by 0 days.

(21) Appl. No.: 17/132,559

(22) Filed: Dec. 23, 2020

Related U.S. Application Data

(60) Provisional application No. 62/959,345, filed on Jan. 10, 2020.

(51) Int. Cl.
    H03M 13/11      (2006.01)
    H03M 13/00      (2006.01)
    H04L 9/06       (2006.01)

(52) U.S. Cl.
    CPC ..... *H03M 13/1102* (2013.01); *H03M 13/616* (2013.01); *H04L 9/0656* (2013.01)

(58) Field of Classification Search
    None
    See application file for complete search history.

(56) References Cited

U.S. PATENT DOCUMENTS

| | | | |
|---|---|---|---|
| 7,093,183 B2 * | 8/2006 | Chen | H03M 13/134 |
| | | | 714/785 |
| 9,432,055 B2 * | 8/2016 | Zhang | H03M 13/116 |
| 9,559,722 B1 * | 1/2017 | Huang | H03M 13/6362 |
| 10,484,012 B1 * | 11/2019 | Tunali | H03M 13/1125 |
| 2020/0313695 A1 * | 10/2020 | Namboodiri | H03M 13/3927 |

* cited by examiner

*Primary Examiner* — Phung M Chung

(57) ABSTRACT

A method of transmitting a message includes, for each data block, generating a root matrix using a generator, generating a quasi-cyclic matrix H using the root matrix, encoding the block using H to create a codeword, and transmitting the codeword. The root matrix includes three submatrices: an identity matrix in an upper-left-hand portion of the root matrix, an identity matrix in a lower-left-hand portion of the root matrix, and a circulant matrix in a right-hand portion of the root matrix. The circulant matrix equals the sum of an identity matrix and an identity matrix with rows shifted once to the right. Generating H includes expanding the root matrix by replacing 0 elements in the root matrix by a square matrix of 0 elements and replacing 1 elements in the root matrix by a shifted diagonal matrix. Non-zero elements of the diagonal matrix are selected from GF(q) based on the generator.

7 Claims, 30 Drawing Sheets

$$H = \begin{pmatrix} 1 & 1 & 0 \\ 1 & 0 & 1 \\ 0 & 1 & 1 \\ 1 & 1 & 1 \\ 1 & 0 & 0 \\ 0 & 1 & 0 \\ 0 & 0 & 1 \end{pmatrix} \begin{matrix} v_1 \\ v_2 \\ v_3 \\ v_4 \\ v_5 \\ v_6 \\ v_7 \end{matrix}$$

FIG. 2

$$H_{r,4\times6} = \begin{bmatrix} & v_1 & v_2 & v_3 & v_4 & v_5 & v_6 \\ c_1 & 1 & 0 & 1 & 1 & 0 & 0 \\ c_2 & 0 & 1 & 0 & 1 & 1 & 0 \\ c_3 & 1 & 0 & 0 & 0 & 1 & 1 \\ c_4 & 0 & 1 & 1 & 0 & 0 & 1 \end{bmatrix}$$

FIG. 7

$$H_{r,6\times 9} = \begin{bmatrix} & v_1 & v_2 & v_3 & v_4 & v_5 & v_6 & v_7 & v_8 & v_9 \\ c_1 & 1 & 0 & 0 & 1 & 1 & 0 & 0 & 0 & 0 \\ c_2 & 0 & 1 & 1 & 0 & 1 & 1 & 0 & 0 & 0 \\ c_3 & 0 & 0 & 1 & 0 & 0 & 1 & 1 & 0 & 0 \\ c_4 & 1 & 0 & 0 & 0 & 0 & 0 & 1 & 1 & 0 \\ c_5 & 0 & 1 & 0 & 0 & 0 & 0 & 0 & 1 & 1 \\ c_6 & 0 & 0 & 1 & 1 & 0 & 0 & 0 & 0 & 1 \end{bmatrix}$$

$(a \times 1) + (1 \times a) = 0$
$(b \times 1) + (1 \times b) = 0$
$(c \times 1) + (1 \times c) = 0$
$\vdots$

FIG. 14

$(f \times a) + (1 \times a_1) = 0 \rightarrow a_1 = f \times a$
$(g \times b) + (1 \times b_1) = 0 \rightarrow b_1 = g \times b$
$(h \times c) + (1 \times c_1) = 0 \rightarrow c_1 = h \times c$
$(i \times d) + (1 \times d_1) = 0 \rightarrow d_1 = i \times d$
$(j \times e) + (1 \times e_1) = 0 \rightarrow e_1 = j \times e$

$(f \times a) + (1 \times a_1) = 0 \rightarrow a_1 = f \times a$
$(g \times b) + (1 \times b_1) = 0 \rightarrow b_1 = g \times b$
$\vdots$
$(k \times a_1) + (1 \times a_2) = 0 \rightarrow a_2 = k \times a_1$
$(l \times b_1) + (1 \times b_2) = 0 \rightarrow b_2 = l \times b_1$
$\vdots$
$(p \times a_2) + (1 \times a_3) = 0 \rightarrow a_3 = p \times a_2$
$(q \times b_2) + (1 \times b_3) = 0 \rightarrow b_3 = q \times b_2$
$\vdots$

$$(a \times 1) + (1 \times a) = 0$$
$$(b \times 1) + (1 \times b) = 0$$
$$(c \times 1) + (1 \times c) = 0$$
$$\vdots$$

FIG. 19

$(a \times g) + (1 \times a_1) = 0 \rightarrow a_1 = a \times g$ $(b \times h) + (1 \times b_1) = 0 \rightarrow b_1 = b \times h$ $(c \times i) + (1 \times c_1) = 0 \rightarrow c_1 = c \times i$ $(d \times j) + (1 \times d_1) = 0 \rightarrow d_1 = d \times j$ $(e \times f) + (1 \times e_1) = 0 \rightarrow e_1 = e \times f$

$(a \times h) + (1 \times a_1) = 0 \rightarrow a_1 = a \times h$
$(b \times i) + (1 \times b_1) = 0 \rightarrow b_1 = b \times i$
$\vdots$
$(a_1 \times o) + (1 \times a_2) = 0 \rightarrow a_2 = a_1 \times o$
$(b_1 \times k) + (1 \times b_2) = 0 \rightarrow b_2 = b_1 \times k$
$\vdots$
$(a_2 \times p) + (1 \times a_3) = 0 \rightarrow a_3 = a_2 \times p$
$(b_2 \times q) + (1 \times b_3) = 0 \rightarrow b_3 = b_2 \times q$
$\vdots$

FIG. 22

|   | X |   |   |   |   | Y |   |   |   |   | XY |   |   |   |   |
|---|---|---|---|---|---|---|---|---|---|---|---|---|---|---|---|
| 0 | a | 0 | 0 | 0 |   | 0 | 0 | f | 0 | 0 |   | 0 | 0 | 0 | k | 0 |
| 0 | 0 | b | 0 | 0 |   | 0 | 0 | 0 | g | 0 |   | 0 | 0 | 0 | 0 | l |
| 0 | 0 | 0 | c | 0 |   | 0 | 0 | 0 | 0 | h |   | m | 0 | 0 | 0 | 0 |
| 0 | 0 | 0 | 0 | d |   | i | 0 | 0 | 0 | 0 |   | 0 | n | 0 | 0 | 0 |
| e | 0 | 0 | 0 | 0 |   | 0 | j | 0 | 0 | 0 |   | 0 | 0 | 0 | 0 | 0 | k=axg; l=bxh; m=cxi; n=dxj; o=exf;

$$X = \begin{pmatrix} 0 & 0 & 0 & 0 & 0 \\ a & 0 & 0 & 0 & 0 \\ 0 & b & 0 & 0 & 0 \\ 0 & 0 & c & 0 & 0 \\ 0 & 0 & 0 & d & 0 \\ 0 & 0 & 0 & 0 & e \end{pmatrix} \quad Y = \begin{pmatrix} 0 & a^{-1} & 0 & 0 & 0 \\ 0 & 0 & b^{-1} & 0 & 0 \\ 0 & 0 & 0 & c^{-1} & 0 \\ 0 & 0 & 0 & 0 & d^{-1} \\ e^{-1} & 0 & 0 & 0 & 0 \end{pmatrix} \quad X^{-1} = \begin{pmatrix} 0 & 0 & 0 & 0 & e^{-1} \\ a^{-1} & 0 & 0 & 0 & 0 \\ 0 & b^{-1} & 0 & 0 & 0 \\ 0 & 0 & c^{-1} & 0 & 0 \\ 0 & 0 & 0 & d^{-1} & 0 \end{pmatrix}$$

FIG. 26

$$H_{r,4\times 6} = \begin{bmatrix} 1 & 0 & 1 & 1 & 0 & 0 \\ 0 & 1 & 0 & 1 & 1 & 0 \\ 1 & 0 & 0 & 0 & 1 & 1 \\ 0 & 1 & 1 & 0 & 0 & 1 \end{bmatrix} = \begin{bmatrix} 1 & 0 & 1 & 1 & 0 & 0 & 1 & 1 \\ 0 & 1 & 0 & 1 & 1 & 0 & 0 & 1 & 1 \\ 1 & 0 & 0 & 0 & 1 & 1 & 0 & 0 & 1 \\ 0 & 1 & 1 & 0 & 0 & 1 \end{bmatrix}$$

FIG. 27

$$H_{4\times 6} = \begin{bmatrix} I_{A_1} & 0_X & I_{B_1} & I_0 & 0_X & 0_X \\ 0_X & I_{A_2} & 0_X & I_{T_1} & I_0 & 0_X \\ I_{A_3} & 0_X & 0_X & 0_X & I_{T_2} & I_0 \\ 0_X & I_{C_1} & I_{D_1} & 0_X & 0_X & I_{E_1} \end{bmatrix}$$

FIG. 28

$$H_{\tau,6\times 9} = \begin{bmatrix} 1 & 0 & 0 & 1 & 1 & 0 & 0 & 0 & 1 \\ 0 & 1 & 0 & 0 & 1 & 1 & 0 & 0 & 0 \\ 0 & 0 & 1 & 1 & 0 & 1 & 0 & 0 & 0 \\ 1 & 1 & 0 & 1 & 0 & 0 & 0 & 0 & 0 \\ 0 & 1 & 1 & 0 & 0 & 0 & 1 & 1 & 0 \\ 0 & 0 & 1 & 0 & 0 & 0 & 0 & 1 & 1 \end{bmatrix}$$

$$= \begin{bmatrix} 1 & 0 & 0 & 1 & 1 & 0 & 0 & 0 & 1 \\ 0 & 1 & 0 & 0 & 1 & 1 & 0 & 0 & 0 \\ 0 & 0 & 1 & 1 & 0 & 1 & 0 & 0 & 0 \\ 1 & 1 & 0 & 1 & 0 & 0 & 0 & 0 & 0 \\ 0 & 1 & 1 & 0 & 0 & 0 & 1 & 1 & 0 \\ 0 & 0 & 1 & 0 & 0 & 0 & 0 & 1 & 1 \end{bmatrix}$$

FIG. 29

$$H_{6\times 9} = \begin{bmatrix} I_{A_1} & 0_X & 0_X & I_{B_1} & I_0 & 0_X & 0_X & 0_X & 0_X \\ 0_X & I_{A_2} & 0_X & 0_X & I_{T_1} & I_0 & 0_X & 0_X & 0_X \\ 0_X & 0_X & I_{A_3} & 0_X & 0_X & I_{T_2} & I_0 & 0_X & 0_X \\ I_{A_4} & 0_X & 0_X & 0_X & 0_X & 0_X & I_{T_3} & I_0 & 0_X \\ 0_X & I_{A_5} & 0_X & 0_X & 0_X & 0_X & 0_X & I_{T_4} & I_0 \\ 0_X & 0_X & I_{C_1} & I_{D_1} & 0_X & 0_X & 0_X & 0_X & I_{E_1} \end{bmatrix}$$

FIG. 30

METHODS OF SECURE COMMUNICATION USING LOW-DENSITY PARITY CHECK CODING

CROSS REFERENCE TO RELATED APPLICATIONS

This application claims priority to U.S. provisional patent application Ser. No. 62/959,345, filed Jan. 10, 2020, titled "Methods of Secure Communication Using Low-Density Parity Check Coding," the contents of which are hereby incorporated by reference herein in their entirety.

FIELD OF INVENTION

The present invention relates, in general, to methods of secure communication and, in particular, to methods of secure communication using low-density parity check coding.

SUMMARY

One embodiment of the present invention is a computer-implemented method of transmitting a message securely over a channel. The method includes generating a pseudo-random seed value and initializing a pseudorandom number generator based on the pseudorandom seed value. The method also includes, for each data block s of the message, generating a binary root matrix based on output of the pseudorandom number generator, generating a quasi-cyclic matrix H based on the binary root matrix, encoding the data block s using the quasi-cyclic matrix H, to create a punctured codeword, and transmitting the punctured codeword over the channel. The binary root matrix includes three submatrices, including a first n×n identity matrix located in an upper-left-hand portion of the binary root matrix, a second n×n identity matrix located in a lower-left-hand portion of the binary root matrix, and a 2n×2n circulant matrix located in a right-hand portion of the binary root matrix. The 2n×2n circulant matrix is equal to the sum of 1) a 2n×2n identity matrix, and 2) a 2n×2n identity matrix with all rows circularly shifted to the right by 1. Generating the quasi-cyclic matrix H includes expanding the binary root matrix by replacing each 0 element in the binary root matrix by a square matrix with all 0 elements and replacing each 1 element in the binary root matrix by a shifted diagonal matrix having a shift value. Non-zero elements of the shifted diagonal matrix are selected from GF(q) based on outputs of the pseudorandom number generator. The shift value is selected based on output of the pseudorandom number generator.

BRIEF DESCRIPTION OF THE DRAWINGS

FIG. 2 is a diagram of a binary matrix;

FIG. 7 is a root matrix;

FIG. 9 is a root matrix;

FIG. 13 is a T matrix and its inverse, $T^{-1}$;

FIG. 14 and FIG. 15 are systems of equations corresponding to matrix calculations relating to FIG. 13;

FIG. 16 is a $T^{-1}$ matrix;

FIG. 17 is a system of equations corresponding to matrix calculations relating to FIG. 16;

FIG. 18 is a T matrix and its inverse, $T^{-1}$;

FIG. 19 and FIG. 20 are systems of equations corresponding to matrix calculations relating to FIG. 18;

FIG. 21 is a $T^{-1}$ matrix;

FIG. 22 and FIG. 23 are systems of equations corresponding to matrix calculations relating to FIG. 21;

Figure 24:
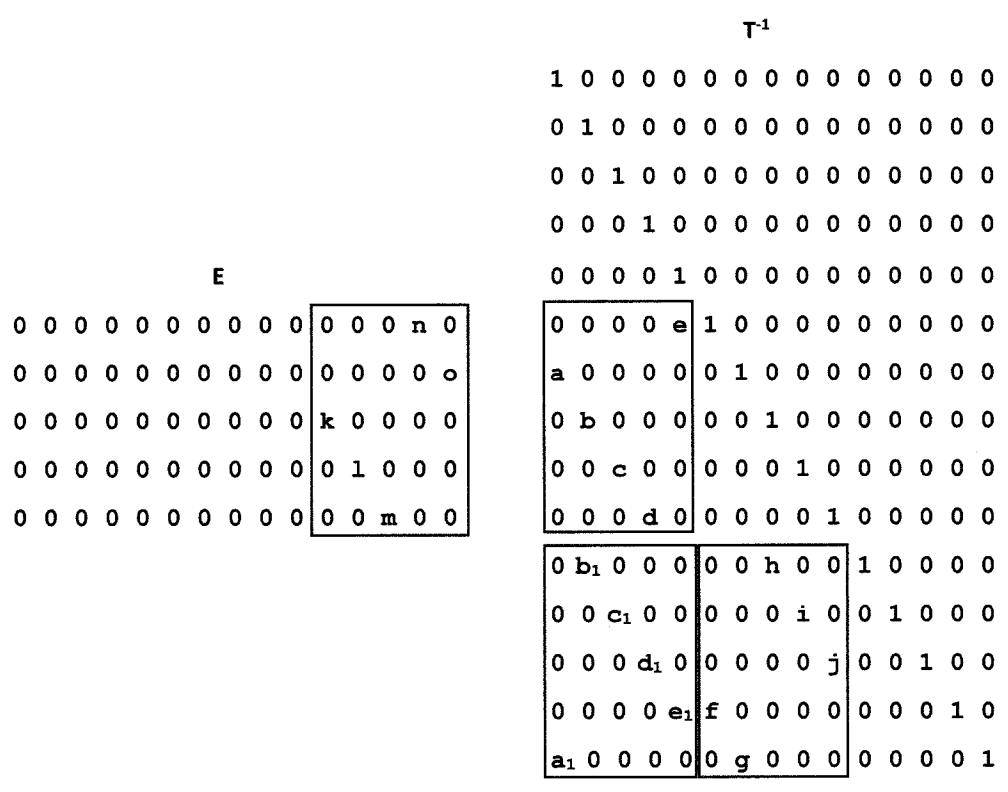

FIG. 24 is an E matrix and a $T^{-1}$ matrix;

Figure 25:
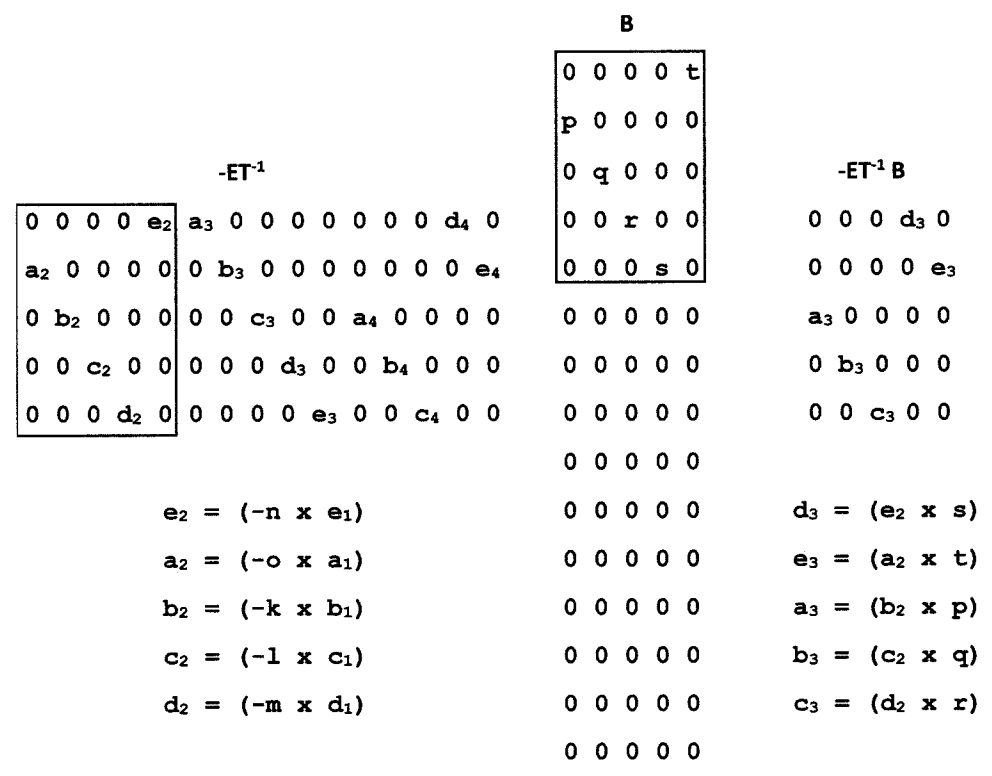

FIG. 25 is an illustration of matrix multiplication corresponding to the matrices of FIG. 24;

FIG. 26 is a collection of exemplary lookup tables.

FIGS. 27 and 29 are root matrices.

FIGS. 28 and 30 are parity matrices.

DETAILED DESCRIPTION

Methods of combining cryptographic encoding and LDPC encoding for the purpose of enhancing privacy are described in accordance with embodiments of the present invention. Enhanced privacy is created by a "chicken and egg" problem for an eavesdropper, conventionally known as Eve. Eve wants clean bits to break the cryptographic code, but cannot take advantage of the error correction coding to get clean bits because it is intertwined with the cryptographic code. These methods use pseudorandom number generators (PRNGs) and can create ciphertext that is at least as private as a standard additive (XORing) cryptosystem, and also has error correcting capability.

Figure 1:
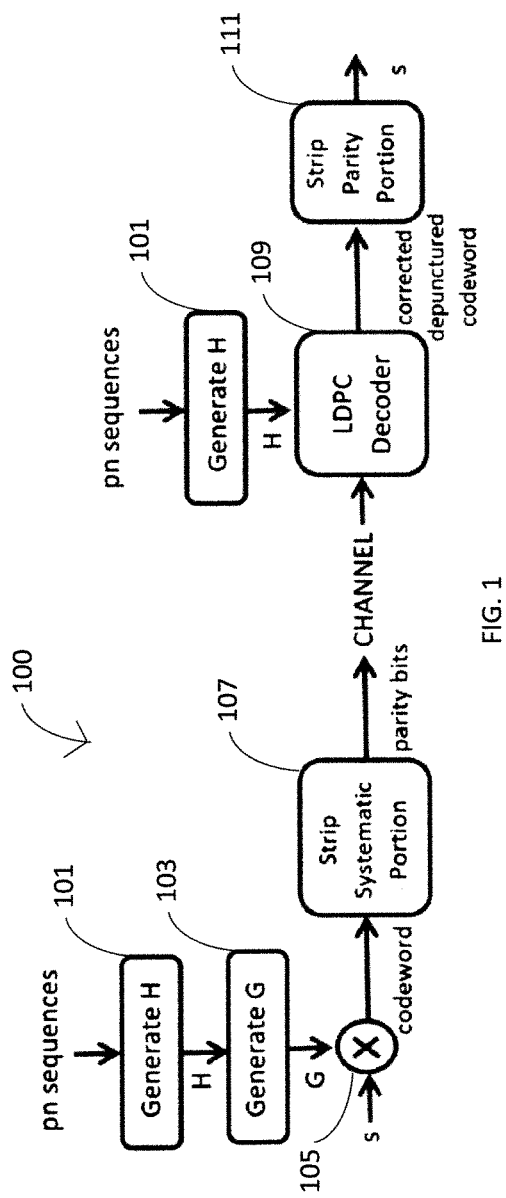
FIG. 1 is a flow diagram of a system for communication across a channel using an LDPC.

Methods in accordance with embodiments of the present invention may be employed for enhancing privacy over a digital communications link. A quasi-cyclic (QC) low density parity check (LDPC) code may be combined with a cryptographic code in order to achieve such an enhancement. Special care is taken to make this combination effective as well as efficient to implement in digital logic. The general overview of a generalized communications system is shown in FIG. 1. Let us suppose that Alice wants to send a message to Bob and wants to keep this message from Eve, the eavesdropper. Both Alice and Bob employ the same set of cryptographically secure pseudorandom number generators (PRNGs) (generated using AES in counter mode, for example) and use these PRNGs to generate the same QC-LDPC codes.

FIG. 1 is a flow diagram of a system for communication across a channel using an LDPC. Both Alice and Bob employ the same PRNGs and generate 101 the same H matrices. Alice further generates 103 a systematic G matrix from H and uses this to encode 105 the message, s, into a codeword. She punctures 107 the message portion from the codeword before sending it. Bob uses his H matrix to depuncture 109 the message portion of the codeword with or without errors due to the channel. Any parity bits can then be stripped 111 from the corrected depunctured codeword, resulting in the original message, s. New H and G matrices are used for each message block. LDPC codes are used for forward error correction and are often represented by their parity check matrices, labeled H. Binary versions of these codes (which are used most often in practice) will have binary H matrices with relatively few 1s and relatively many 0s, thus having a "low density."

Figure 3:
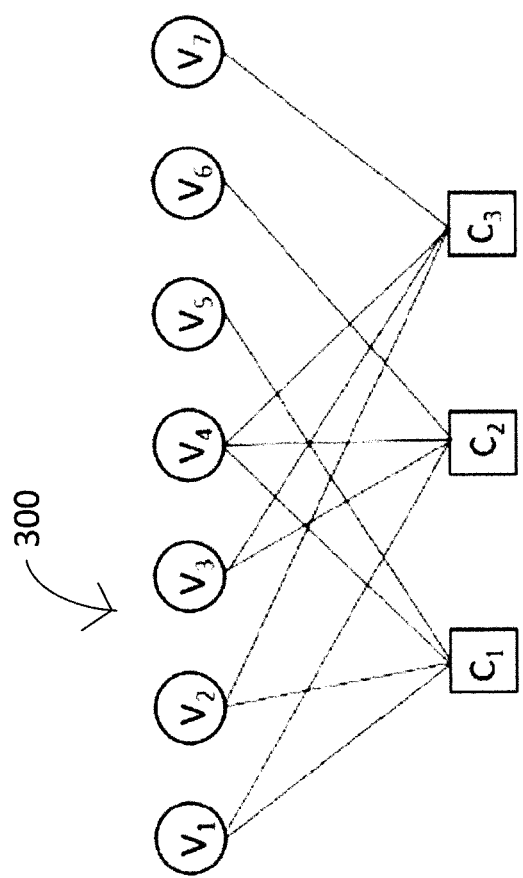
FIG. 3 is a graph corresponding to the binary matrix of FIG. 2.

FIG. 2 is a diagram of a binary matrix. FIG. 3 is a graph corresponding to the binary matrix of FIG. 2. The binary matrix and the graph both can define a small exemplary LDPC code. The binary H matrix 200 gives rise to the graph 300. There are 3 rows and thus 3 check nodes. The 7 columns specify the 7 variable nodes. Connections, called edges, are made for each 1 entry in the H matrix at the appropriate row and column. A system of parity check equations can also be derived from the H matrix:

$$V_1 + V_2 + V_4 + V_5 = 0$$

$$V_1 + V_3 + V_4 + V_6 = 0$$

$$V_2 + V_3 + V_4 + V_7 = 0$$

Note that these equations use GF(2) arithmetic. Thus 1+1=0+0=0 and 1+0=0+1=1. Also note that this particular LDPC code is not actually low density.

In addition to H matrices, LDPC codes are also represented by factor graphs. These bipartite graphs can be created directly from the H matrices with each row specifying a check node and each column specifying a variable node. Edges that connect a variable node to a check node are drawn for each 1 entry in the H matrix located at the intersection of the respective column and row as seen in FIG. 3. In the LDPC decoder, these edges are used to pass information between the check and variable nodes following the sum-product algorithm or some approximation. At the LDPC encoder, a separate G matrix is created from the H matrix (using Gaussian elimination or other methods as known in the art) and the transmitter multiplies the message block (a vector) by this G matrix to obtain the codeword vector. The codeword is transmitted along a noisy channel before being collected at the receiver. The receiver employs the sum-product algorithm which results in a valid codeword (with errors removed), provided that there are not too many errors in the received codeword. The receiver then obtains the message from the valid codeword.

With the same PRNGs, Alice and Bob create the same parity check (H) matrices using a process specified in the next section. Alice can further calculate the generator (G) matrix from H and use this to encode the message, s, into a codeword. It is assumed that Alice and Bob use a systematic code which uses codewords that include the original message. Alice punctures (removes) the message from the codeword before sending it to the transmitter. Bob uses his H matrix at the receiver to depuncture (recreate) the message portion of the codeword. For the next message block, this procedure is repeated and a new H matrix (a new LDPC code) is created and used. For each message block, Bob needs the correct H matrix to properly depuncture the codeword and recover the message.

In a traditional system, Alice encrypts the message (by XORing it with a stream from the PRNG for example) and then uses standard static LDPC encoding so that Bob can remove errors in the encrypted message due to the channel. Eve is able to get her own copy of codewords. She does not know what LDPC code is being used. However, we assume that she is sophisticated and is able to figure out H over time by analyzing her received series of codewords. She uses her H matrix to perform error correction and then has a clean copy of Alice's encrypted message blocks. With a clean copy of the encrypted message, she may eventually break the encryption and recover Alice's message. However, using the system described in FIG. 1, Eve will have more difficulty recovering the message. She does not have access to the PRNGs, H matrices, or G matrices being used. Looking for patterns in her series of codewords is not fruitful because H changes for each codeword. Thus, she may be stuck at this stage. Because encryption and error correction are combined, Eve has to try to perform error correction and cryptanalysis together, or perform cryptanalysis on noisy codewords. For large entropy PRNGs, Eve may desire a long string of error free (or near error free) transmitted bits to use for identifying these PRNGs and decrypting Alice's message. However, to make use of the error correcting capabilities of the transmission, she will need the H matrix which is determined by the PRNGs. This combination of privacy and error correction creates a "chicken and egg" issue for Eve.

Alice punctures the message portion of the codeword before sending it across the channel so that Eve does not directly receive the message. Thus, the rate of the LDPC code (the message block length divided by the codeword length) before puncturing must be less than 1/2. Note that a 1/2 rate code before puncturing would lead to a rate 1 code after puncturing and would not have any error correcting capability if a random or fully compressed message is assumed.

A useful modification to the system in FIG. 1 is to have multiple H matrices stored at the receiving system. Bits from the PRNGs can determine which H matrix to use. The corresponding G matrices would be stored at the transmitting system. The implementation complexity of this system will increase as the number of possible H (and G) matrices increases. For example, if there are 10 different codes to choose from, Alice and Bob may have to implement 10 different encoders and decoders respectively. However, since each of these 10 different codes is used approximately 10% of the time, Eve may be able to collect enough codewords and figure out these 10 codes. She can then build 10 decoders and survey which code is being used for each codeword to rebuild Alice's message. Eve may not be able to do this if 10 million codes are used instead of 10. However, Alice and Bob will need to have much larger systems. Having an adequately private system may require too many matrices to reasonably store and implement, depending on the details of the situation.

Determining Initial H Matrices

Figure 4:
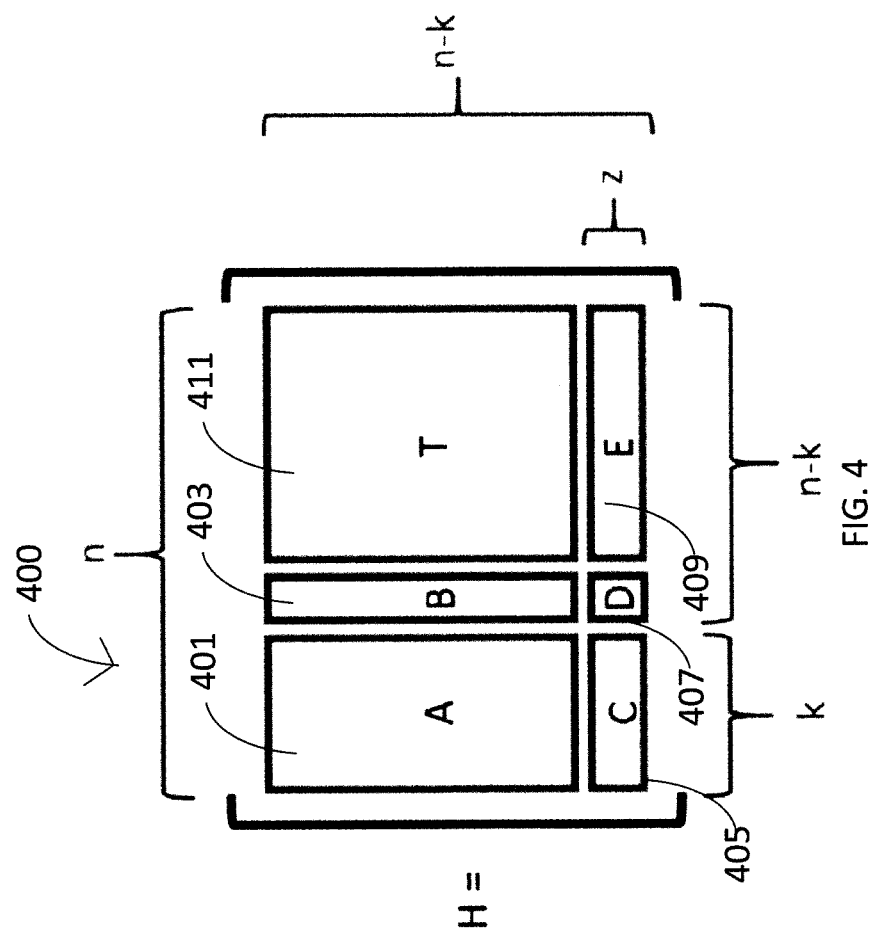
FIG. 4 is a diagram showing the composition of an H matrix.

The H matrix 400, shown in FIG. 4, is divided into subsections A 401, B 403, C 405, D 407, E 409, and T 411, where T 411 is lower triangular. The codeword length is n while the message length is k. T and D are square submatrices.

Figure 5:
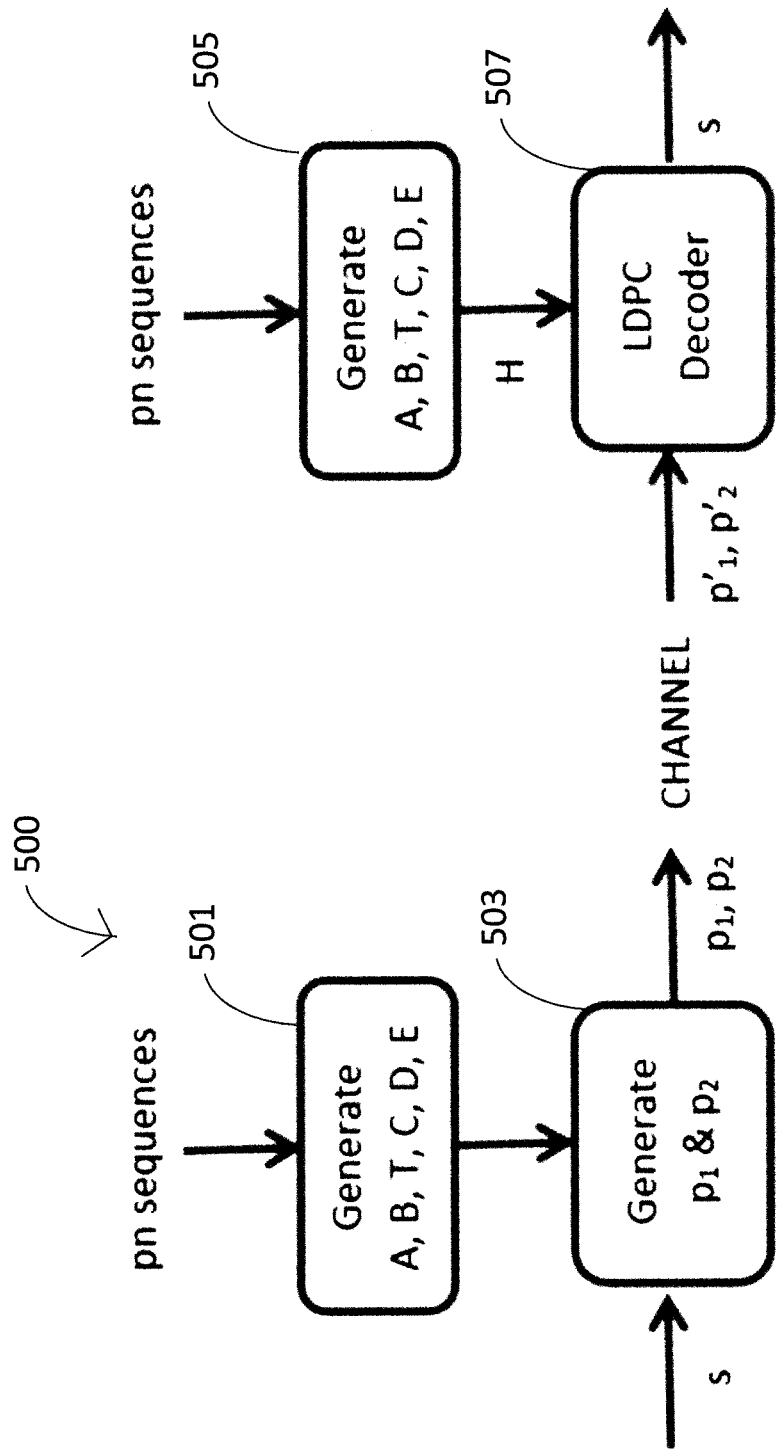
FIG. 5 is a flow diagram of a modified system based on the system of FIG. 1.
Figure 6:
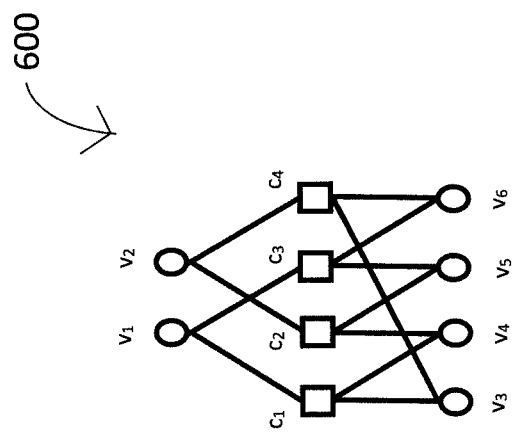
FIG. 6 is a graph corresponding to a root matrix.
Figure 8:
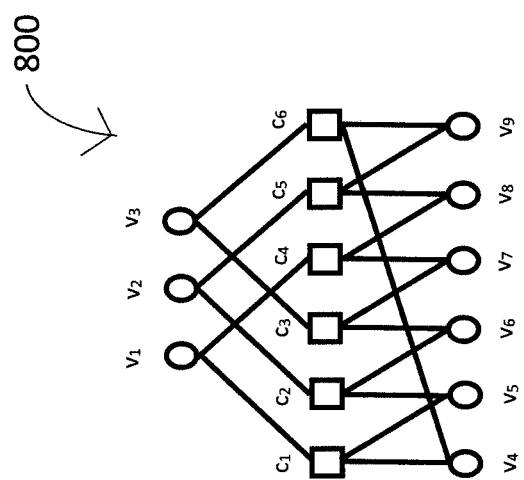
FIG. 8 is a graph corresponding to a root matrix.

These subsections can be manipulated in accordance with the following equations:

$$\varphi = -ET^{-1}B + D$$

$$p_1^T = \varphi^{-1}[-ET^{-1}As^T + Cs^T]$$

$$p_2^T = T^{-1}[As^T + Bp_1^T]$$

where column vector $s^T$ is the transpose of the message row vector s. Note the lack of a G matrix and the calculations of $p_1^T$ and $p_2^T$ instead. The systematic codeword is the concatenated row vector: [s $p_1$ $p_2$]. Also note that given H, Alice would have to perform 2 matrix inversions. However, if B, T, D and E are in a certain form, these inversions can be simple. The overview in FIG. 1 is modified to reflect these choices for encoding and shown in FIG. 5.

LDPC codes represented by large girth graphs generally perform better than codes represented by graphs of smaller girth. This fact is considered when creating an ensemble of H matrices that will be used in this system. The progressive edge growth (PEG) algorithm may be used to help create this set of H matrices because the PEG algorithm is a simple and efficient way of creating large girth graphs. Small matrices, termed "root matrices" in this paper, are first created. Exemplary root matrices are shown in FIGS. 6-9. These are the 2 smallest root matrices under consideration. Note the patterns in the graphs. The lower sections look like an accordion while the upper edges connect additional variable nodes to pairs of check nodes that impact the girth of the graph minimally.

The lower portions of the graph containing the check nodes and the higher numbered variable nodes are connected to create a graph with the largest girth possible, a circular configuration of alternating variable and check nodes that is rearranged to look like an accordion. The additional variable nodes are placed above the check nodes so that they affect the girth to the minimal extent possible. The first variable node is connected to the first check node and the check node just past the halfway point in the line of check nodes. The other variable nodes follow suit as shown in the figure. This addition of variable nodes reduces the girth of the graph. For example, the addition of v1 and v2 in FIGS. 6 and 7 reduces the girth from 8 to 6 while the addition of v1, v2 and v3 in FIGS. 8 and 9 reduces that graph's girth from 12 to 8.

Note the pattern in the H matrices. The left side is composed of 2 identity matrices, one above the other. The right side of H is a weight 2 circulant matrix formed by the addition of an identity matrix and the identity matrix circularly shifted to the right by 1. Following this pattern leads to H matrices having an even number of rows and thus an even number of check nodes. Another reason for having H matrices with an even number of rows is that rate 1/3 codes are being created. This requires 1.5 times as many variable nodes as check nodes. Note that code rates of 1/3 are reduced to 1/2 after puncturing the message. Other code rates can be explored in an effort to shift average error rate performance as desired.

Building Quasi-Cyclic Matrices

LDPC codes using quasi-cyclic H matrices are popular because they have efficient encoding and decoding implementations. There are various ways that quasi-cyclic H matrices with high girth can be constructed. The small H matrices (root matrices) discussed above can be expanded into larger quasi-cyclic matrices. This expansion involves replacing the 1s with weight 1 circulant matrices (circularly shifted identity matrices) and replacing the 0s with all-zero matrices to create "full matrices." These shifted identity and zero submatrices are all the same size for a given root matrix. Which root matrix is used and the amount of shift in the circulant submatrices are determined by bits from a set of PRNGs and new values are determined for each message block. Several different sized root matrices are used in this system. So that Eve is not given which root matrix is used for a given codeword (assuming that Eve is clever enough to determine codeword sizes), all the expanded H matrix sizes are equal. For example, the family of 480×720 sized H matrices could be constructed with root matrix and submatrix sizes shown in the first 2 columns of Table I. Note that the root matrices are restricted to have an even number of rows as discussed above. Also note that the submatrix sizes do not drop below 15×15. As the submatrix sizes become smaller, the implementation of the LDPC decoder in digital logic becomes more complex. The 3rd column in Table I is the girth of each root matrix. The girth of the full 480×720 H matrix will usually be much greater than its associated root matrix. In the extreme case (such as when all the shifts of the circulant submatrices are the same) the girth of the full matrix will be the same as the girth for its root matrix.

TABLE 1

Family of Quasi-Cyclic H Matrices of Size 480 × 720

| Root Matrix Size | Submatrix Size | Root Matrix Girth | Number of Matrices Number of Matrices Under GF(2) | Number of Matrices Under GF(4) |
|---|---|---|---|---|
| 4 × 6 | 120 × 120 | 6 | $120^4 \approx 2.07 \times 10^8$ | $2.16 \times 10^{237}$ |
| 6 × 9 | 80 × 80 | 8 | $80^6 \approx 2.62 \times 10^{11}$ | $2.73 \times 10^{240}$ |
| 8 × 12 | 60 × 60 | 10 | $60^8 \approx 1.68 \times 10^{14}$ | $1.75 \times 10^{243}$ |
| 10 × 15 | 48 × 48 | 12 | $48^{10} \approx 6.49 \times 10^{16}$ | $6.77 \times 10^{245}$ |
| 12 × 18 | 40 × 40 | 14 | $40^{12} \approx 1.68 \times 10^{19}$ | $1.74 \times 10^{248}$ |
| 16 × 24 | 30 × 30 | 18 | $30^{16} \approx 4.30 \times 10^{23}$ | $4.49 \times 10^{252}$ |
| 20 × 30 | 24 × 24 | 22 | $24^{20} \approx 4.02 \times 10^{27}$ | $4.19 \times 10^{256}$ |
| 24 × 36 | 20 × 20 | 26 | $20^{24} \approx 1.68 \times 10^{31}$ | $1.75 \times 10^{260}$ |
| 30 × 45 | 16 × 16 | 32 | $16^{30} \approx 1.33 \times 10^{36}$ | $1.38 \times 10^{265}$ |
| 32 × 48 | 15 × 15 | 34 | $15^{32} \approx 4.31 \times 10^{37}$ | $4.50 \times 10^{266}$ |

Table 1 shows the root matrix and sub-matrix sizes used to construct 480×720 H matrices. The girth of the root matrices are given in column 3. Note that the girth of a final 480 720 H matrix will be at least the girth of its associated root matrix. The 4th and 5th columns show the number of unique full H matrices that can be constructed from each root matrix under binary and simplified GF(4) systems respectively.

Figure 10:
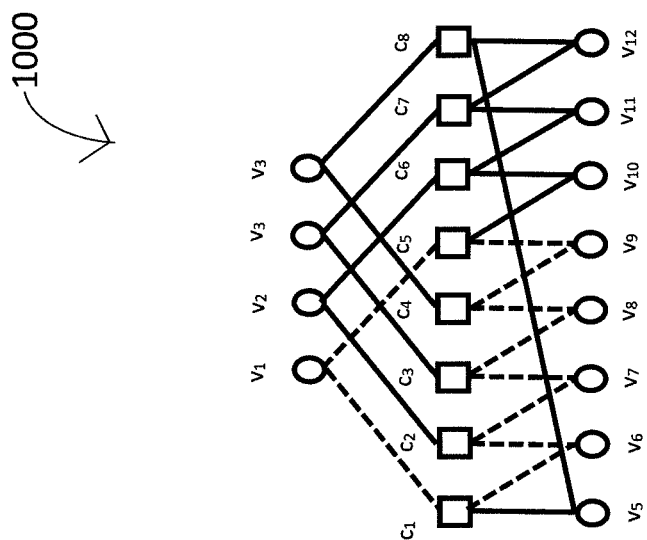
FIG. 10 is a graph corresponding to a root matrix.

FIG. 10 is a graph having 8 check nodes, which thus represents a root matrix with a=8 rows. Variable node $v_1$ is connected to check nodes $c_1$ and $c_{(a/2)+i}=c_5$. These 2 edges together with the 8 edges along the "accordion" between $c_1$ and $c_5$ trace out a cycle of length 10, which is also the girth of this graph. The number of rows in the root matrix+2 is the girth of the root matrix. If there are a rows, then there are a check nodes and a2 variable nodes above the check nodes in the graph (in addition to the a variable nodes below the check nodes), so that H defines a rate 1/3 code. With the pattern developed in this effort, variable node $v_1$ is connected to check nodes $c_1$ and $C_{(a/2)+1}$. One of the multiple cycles that defines the girth of the graph includes these 2 edges in addition to the edges along the "accordion" connecting $c_1$ and $c_{(a2)+1}$. Thus, the girth is 2(a/2)+2=a+2.

Using the family of 480×720 sized H matrices under GF(4) arithmetic, the full and root matrices can be divided into subsections as shown in FIG. 4. The 4×6 binary root matrix created with PEG is shown in FIG. 27.

The divisions of the root matrix on the left show its structure of two $I_{2\times 2}$ matrices at the left (one above the other) and a larger circulant matrix that is the sum of the $I_{4\times 4}$ matrix with a right circular shift of itself. Note that:

$$I_{2\times 2} = \begin{bmatrix} 1 & 0 \\ 0 & 1 \end{bmatrix}$$

and $$\begin{bmatrix} 1 & 0 & 0 & 0 \\ 0 & 1 & 0 & 0 \\ 0 & 0 & 1 & 0 \\ 0 & 0 & 0 & 1 \end{bmatrix} + \begin{bmatrix} 0 & 1 & 0 & 0 \\ 0 & 0 & 1 & 0 \\ 0 & 0 & 0 & 1 \\ 1 & 0 & 0 & 0 \end{bmatrix} = \begin{bmatrix} 1 & 1 & 0 & 0 \\ 0 & 1 & 1 & 0 \\ 0 & 0 & 1 & 1 \\ 1 & 0 & 0 & 1 \end{bmatrix}$$

The root matrix on the right has divisions that demarcate $A_{r,4\times 6}$, $B_{r,4\times 6}$, $T_{r,4\times 6}$, $C_{r,4\times 6}$, $D_{r,4\times 6}$, and $E_{r,4\times 6}$ matrices. Note that for any size root matrices in this system: $T_{r,4\times 6}$ is square and lower triangular, $B_{r,4\times 6}$ is a column vector, $C_{r,4\times 6}$ and $E_{r,4\times 6}$ are row vectors, and $D_{r,4\times 6}$ has size 1×1. Thus, for this 4×6 root matrix example:

$$A_{r,4\times 6} = \begin{bmatrix} 1 & 0 \\ 0 & 1 \\ 1 & 0 \end{bmatrix}; B_{r,4\times 6} = \begin{bmatrix} 1 \\ 0 \\ 0 \end{bmatrix}; T_{r,4\times 6} = \begin{bmatrix} 1 & 0 & 0 \\ 1 & 1 & 0 \\ 0 & 1 & 1 \end{bmatrix}$$

$$C_{r,4\times 6} = [0\ 1]; D_{r,4\times 6} = [1]; E_{r,4\times 6} = [0\ 0\ 1]$$

This root matrix leads to the 480×720 full parity check matrix shown in FIG. 28.

where $0_X$ is the 120×120 all-zero matrix and $I_{Y_n}$, with Y∈{A, B, T, C, D, E}, are 120×120 shifted diagonal matrices with pseudorandom circular shifts between 0 and 119 whose non-zero elements are non-zero members in GF(4). Also note that along the diagonal of matrix T are elements $I_0$ that are 120×120 binary unshifted identity matrices. As with its root matrix, $H_{4\times 6}$ can be broken into:

$$A_{4\times 6} = \begin{bmatrix} I_{A1} & 0_X \\ 0_X & I_{A2} \\ I_{A3} & 0_X \end{bmatrix}; B_{4\times 6} = \begin{bmatrix} I_{B1} \\ 0_X \\ 0_X \end{bmatrix}; T_{4\times 6} = \begin{bmatrix} I_0 & 0_X & 0_X \\ I_{T1} & I_0 & 0_X \\ 0_X & I_{T2} & I_0 \end{bmatrix}$$

$$C_{4\times 6} = [0_X\ I_{C_1}]; D_{4\times 6} = [I_{D_1}]; E_{4\times 6} = [0_X\ 0_X\ I_{E_1}]$$

Observe that the $D_{4\times 6}$ matrix is a single shifted diagonal matrix.

The 6×9 root matrix is created by PEG in a similar fashion: a structure of two $I_{3\times 3}$ matrices at the left (one above the other) and a larger matrix that is the sum of $I_{6\times 6}$ matrix with a right circular shift of itself. Such a matrix is shown in FIG. 29.

This root matrix leads to the 480×720 full parity check matrix shown in FIG. 30.

This time, $0_X$ is the 80×80 all-zero matrix, are 80×80 shifted diagonal matrices with pseudorandom circular shifts between 0 and 79, and $I_0$ is the 80×80 binary unshifted identity matrix. This process can continue for the construction of the other 8 full matrix types. The root matrix sizes and associated all-zero and shifted identity matrix sizes are specified in the first 2 columns of Table 1.

Using the method above, care must be taken to find values of $\varphi = -ET^{-1}B + D$ that are nonsingular. The inverse of T is a quasi-cyclic matrix with z×z submatrices that are either all-zero or circularly shifted diagonal matrices.

This leads to a shifted diagonal, z×z, $-ET^{-1}B$ matrix. When D is chosen to have the same shift as $-ET^{-1}B$, the corresponding non-zero elements along the diagonals of D and $-ET^{-1}B$ should not match. If they do, $\varphi$ will have a 0 along its diagonal at that location and will become singular because 0 has no multiplicative inverse.

Another point to consider is that Alice and Bob want the LDPC code to perform relatively well in order to depuncture the correct message even when some transmitted parity bits are compromised by the channel they share. Alice and Bob may want to make restrictions on the submatrices of H. For example, they can find a subset of shifts in the submatrices of H, derived from each root matrix, that perform well and use those exclusively. Alternatively, Alice and Bob could employ an inner forward error correction (FEC) code.

An observation about the ensemble of H matrices used in this system is that the left third portion has no cycles. The corresponding portion of the root matrix is 2 identity matrices, as mentioned earlier, and it has no cycles because each row has only a single 1. When these 1s are replaced by shifted diagonal matrices, this fact remains. The corresponding left third portion of the full matrix only has a single non-zero value per row and thus no cycles are contained within it. There are no stopping sets within the set of associated variable nodes and thus the message portion of the systematic LDPC codes can be punctured while recovery of this message is possible at the intended receiver.

System Overview

Figure 11:
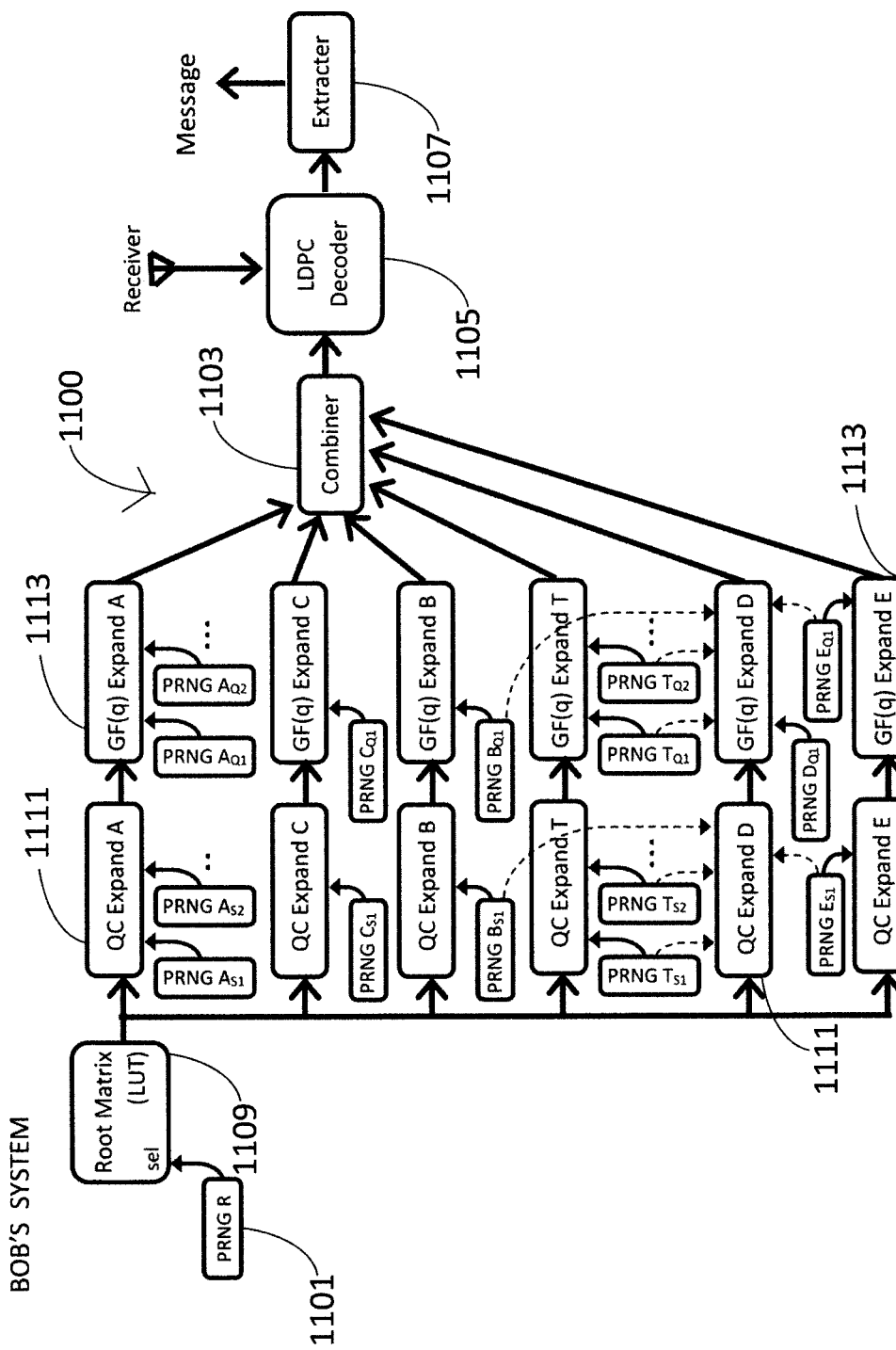
FIG. 11 is a flow diagram of a system for a receiver in accordance with an embodiment of the present invention.

An overview is now given of a system 1100 as may be used by Bob, the intended receiver, in accordance with an embodiment of the present invention. FIG. 11 is a diagram of Bob's system 1100. Both Alice and Bob obtain the same PRNGs 1101 and Bob uses his set to create 1103 the parity check matrix, H. Bob uses his H matrix to depuncture 1105 the message portion of the codeword with or without errors due to the channel Finally, Bob extracts 1107 the systematic portion of this codeword to obtain the message.

The system 1100 includes a Root Matrix (LUT) 1109. The Root Matrix (LUT) 1109 receives bits from PRNG R 1101, and implements a lookup table of various small binary root matrices. For the example set of 10 root matrices detailed above, $\lceil \log_2 10 \rceil = 4$ bits from PRNG R 1101 are used to select which one of the root matrices to use for each H matrix.

QC expand 1111 blocks use bits from PRNGs to expand their respective portions of the root matrix into full sized quasi-cyclic H matrix portions. Specifically, the six submatrices, $A_r$, $B_r$, $T_r$, $C_r$, $D_r$ and $E_r$, are expanded to their full quasi-cyclic sizes using bits from PRNGs to determine the amount of circular shift for each circulant (shifted identity) submatrix. Each circulant submatrix is assigned its own PRNG with the exception of IDI. The shift in this matrix is determined by the shift in $-ET^{-1}B$. Thus, this shift is influenced by the shifts in $I_{E1}, I_{B1}, I_{T1}, I_{T2}, \ldots$. The number of bits needed from each PRNG for the creation of each H matrix is dependent on the circulant submatrix size, z. For example, if a 4×6 root matrix is to be expanded to a 480×720 full H matrix, then each shifted identity matrix uses $\lceil \log_2 120 \rceil = 7$ bits from its respective PRNG. Note that if a system is chosen such that D has a different shift as $-ET^{-1}B$, then an additional PRNG $D_{S1}$ could be used to help determine D's shift.

GF(q) Expand blocks 1113 convert binary matrices A, B, T, C, D and E to non-binary matrices. This is done by replacing each 1 with a non-zero member in GF(q) pseudorandomly. Suppose that this system is under GF(4). Then each 1 is replaced by a 1, 2, or 3 pseudorandomly. Notice that submatrix $I_{D1}$ uses bits from PRNG $D_{Q1}$. However, because corresponding elements from D and $-ET^{-1}B$ will not be equal, PRNGs $B_{Q1}, E_{Q1}, T_{Q1}, T_{Q2}, \ldots$ will have some influence on the GF(q) expansion of D. For each circulant submatrix of size 120×120, Alice and Bob could use $\lceil \log_2 3 \rceil = 2$ bits from its PRNG for each replacement, for a total of $(120)(2) = 240$ bits. However, using 2 bits for every replacement is wasteful. Each shifted identity matrix replaces z=120 is with 1, 2, or 3. Thus $3^{120}$ possibilities exist, needing $\lceil \log_2 3^{120} \rceil$ 191 bits to determine. This could be difficult to implement in digital logic, however. If 8 bits are used to replace 5 non-zero GF(4) symbols (recognizing that $2^8 = 256$ is slightly greater than $3^5 = 248$) then each submatrix would use (120)(8/5)=192 bits from its PRNG. Replacement of 5 symbols at a time might be easier to implement (perhaps with a $2^8=256$ entry LUT) and only uses 1 more bit from the PRNG than the more efficient version.

Combiner 1103 constructs the parity check matrix, H, from matrices A, B, T, C, D, and E.

LDPC Decoder 1105: Bob can use a standard layered decoder to depuncture and error correct the incoming ciphertext. Because a layered decoder is capable of handling multiple, unique check node groups, it should be able to handle different quasi-cyclic parity check matrices with only simple modifications. The variable and check node group sizes are the size of one dimension of the shifted identity or all-zero submatrix sizes, z×z, of the newly created H matrix. In the current example, because 10 root matrices are possible (each with unique z×z submatrix sizes), 10 different layered decoders could be employed. However, this decoding function may be implemented more efficiently using a single, more flexible decoder.

Extractor 1107: After the decoder has depunctured and error corrected the ciphertext, the extractor retains the systematic portion of the codeword which is the message. Once the message portion, s, is received, Bob generates more pseudorandom bits and repeats this process (creating a new H matrix) to receive the next message portion.

Figure 12:
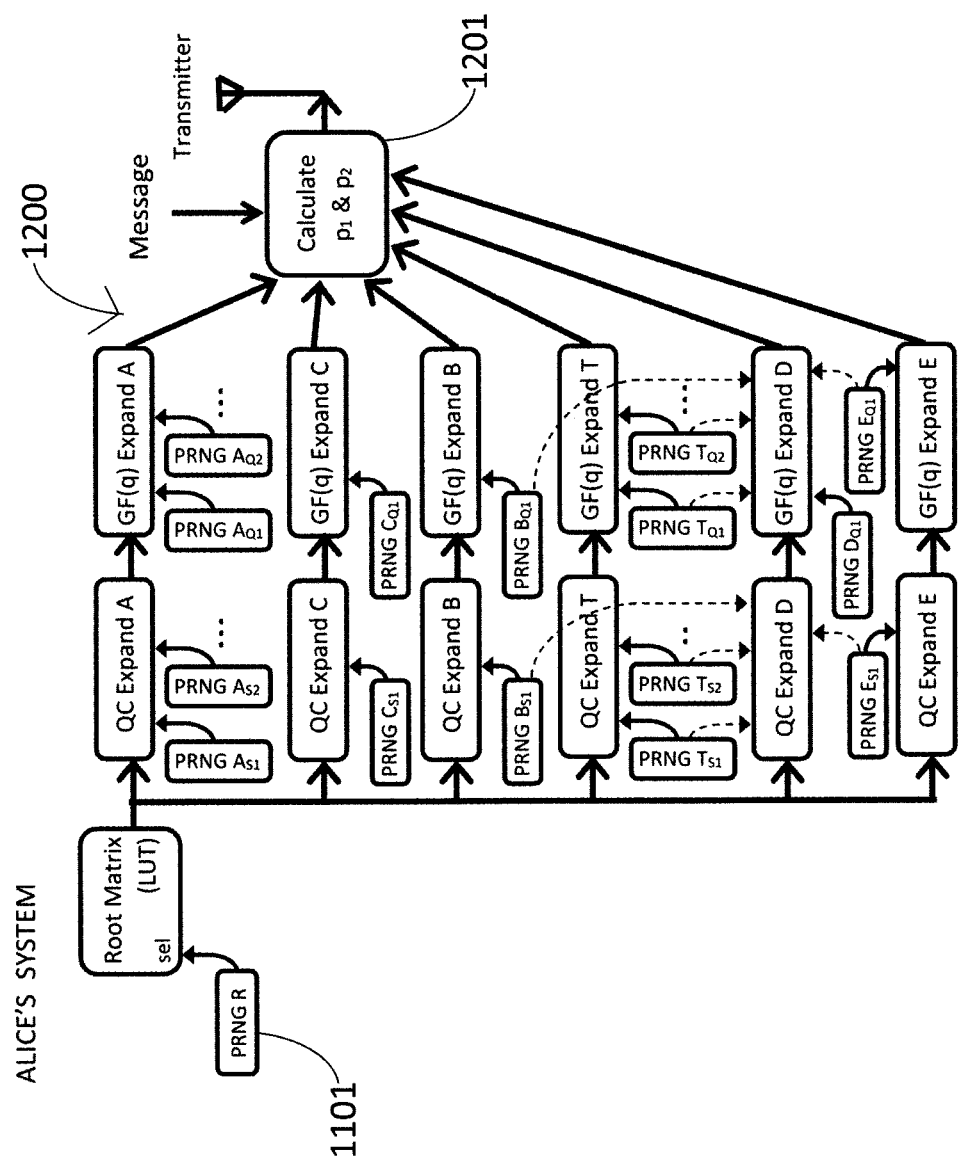
FIG. 12 is a flow diagram of a system for a sender in accordance with an embodiment of the present invention.

An overview is now given of a system 1200 as may be used by Alice, the intended sender, in accordance with an embodiment of the present invention, with reference to FIG. 12. Alice begins by generating her copy of the PRNGs 1101 and using their bits to generate the same A, B, T, C, D, and E matrices as Bob. She uses this information, along with her message, to calculate 1201 the ciphertext, $p_1$ and $p_2$.

The system 1200 calculates $p_1$ and $p_2$ as follows. The system 1200 calculates $T^{-1}$ from T as discussed further below. $\varphi = -ET^{-1}B+D$ is then calculated and inverted as is also described further below. Next, this block calculates $p_1$ and $p_2$ using the equations: $p_1^T = \varphi^{-1} [-ET^{-1}As^T + Cs^T]$ and $p_2^T = T^{-1} [As^T + Bp_1^T]$ where $x^T$ is the transpose of x. Note that all of these calculations are performed under GF(q) arithmetic. The ciphertext $[p_1\ p_2]$ is sent to the transmitter. Once the ciphertext is transmitted, Alice generates more pseudorandom bits and repeats this process to create and transmit the ciphertext for the next message portion.

Inverting T Matrices

Embodiments of the present invention may include efficiently calculating the inverse of the T matrix. The T matrix may be caused to have a special form, thereby ensuring that this calculation can be performed efficiently as described below.

Inverting T with Unshifted Submatrices

Figure 13:
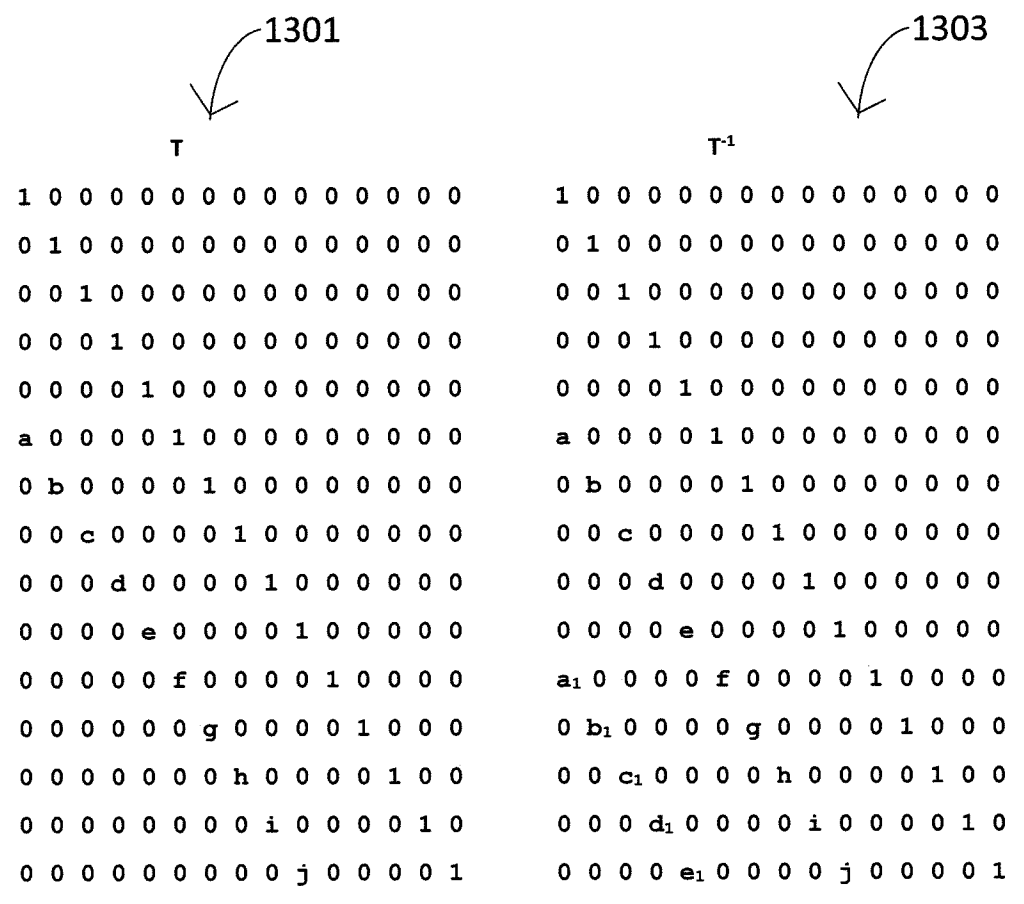

A T matrix 1301 is shown in FIG. 13 which comes from a 4×6 root matrix with submatrix size, z=5, where matrix shifts in $I_{T1}$, $I_{T2}$, and $I_{T3}$ are zero. The main diagonal is populated with 1s while the diagonal z elements down is populated with non-zero elements of GF(q). Also shown is matrix $T^{-1}$ 1303, whose main diagonal and the diagonal z elements down are the same as in T. This has to be the case if the inverse exists because $(T)(T^{-1})=I$. For example, the 1st equation in FIG. 14 shows the inner product of the (z+1)th=6th row of T 1301 with the 1st column of $T^{-1}$ 1303 which equals I(z+1, 1)=0. The 2nd equation shows the inner product of the (z+2)th=$7^{th}$ row of T 1301 with the 2nd column of $T^{-1}$ 1303 which equals I(z+2, 2)=0. The other equations follow suit. Note that these equations are under GF(q) arithmetic. The next diagonal in $T^{-1}$ 1303, 2z+1 elements below the main diagonal and shown in blue, is calculated using the equations in FIG. 15. The 1st equation shows the inner product of the (2z+1)th=11th row of T 1301 with the 1st column of $T^{-1}$ 1303 which equals I(2z+1, 1)=0. The 2nd equation shows the inner product of the (2z+2)th=12th row of T 1301 with the 2nd column of $T^{-1}$ 1303 which equals I(2z+2, 2)=0. The other equations follow suit and this diagonal can be calculated.

Figure 16:
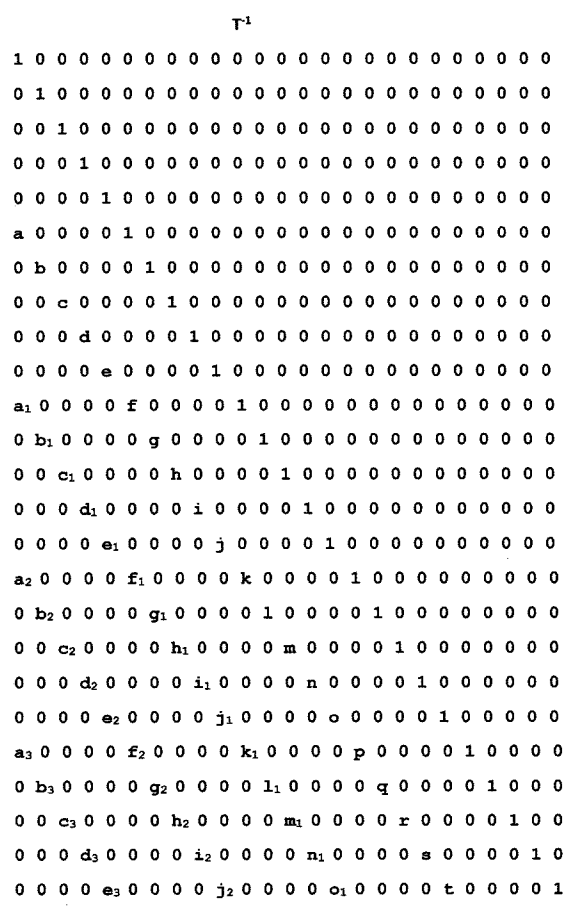

When the root matrix is larger than 4×6, there are more diagonals to calculate. An example with a 6×9 root matrix and a submatrix size, z=5, is shown in FIG. 16. Again, matrix shifts in $I_{T1}$, $I_{T2}$, $I_{T3}$, $I_{T4}$, and $I_{T5}$ are zero. The corresponding T matrix has the same red values as $T^{-1}$ with 0s in the other locations. FIG. 17 displays equations that calculate the elements in the diagonals below the main diagonal. The first set of equations show the inner product of the (2z+n)th row of T with the nth column of $T^{-1}$ which equals I(2z+n, n)=0 where $n \in \{1, 2, \ldots, z\}$. These are similar to the equations in FIG. 15 and are used to calculate the elements along the third non-zero diagonal in FIG. 16, which extends from $a_1$ to $o_1$. The 2nd set of equations in FIG. 16 show the inner product of the (3z+n)th row of T with the nth column of $T^{-1}$ which equals I(3z+n, n)=0. Now the elements along the next shortest non-zero diagonal can be calculated. Finally, the 3rd set of equations show the inner product of the (4z+n)th row of T with the nth column of $T^{-1}$ which can be used to calculate the elements along the shortest non-zero diagonal. Following these examples, a general process for transforming any of the root matrices in this effort, with no shifts in T, can be achieved.

A pseudocode representation of a method for calculating an inverse of a T matrix (no shifts) is given below.

Figure 18:
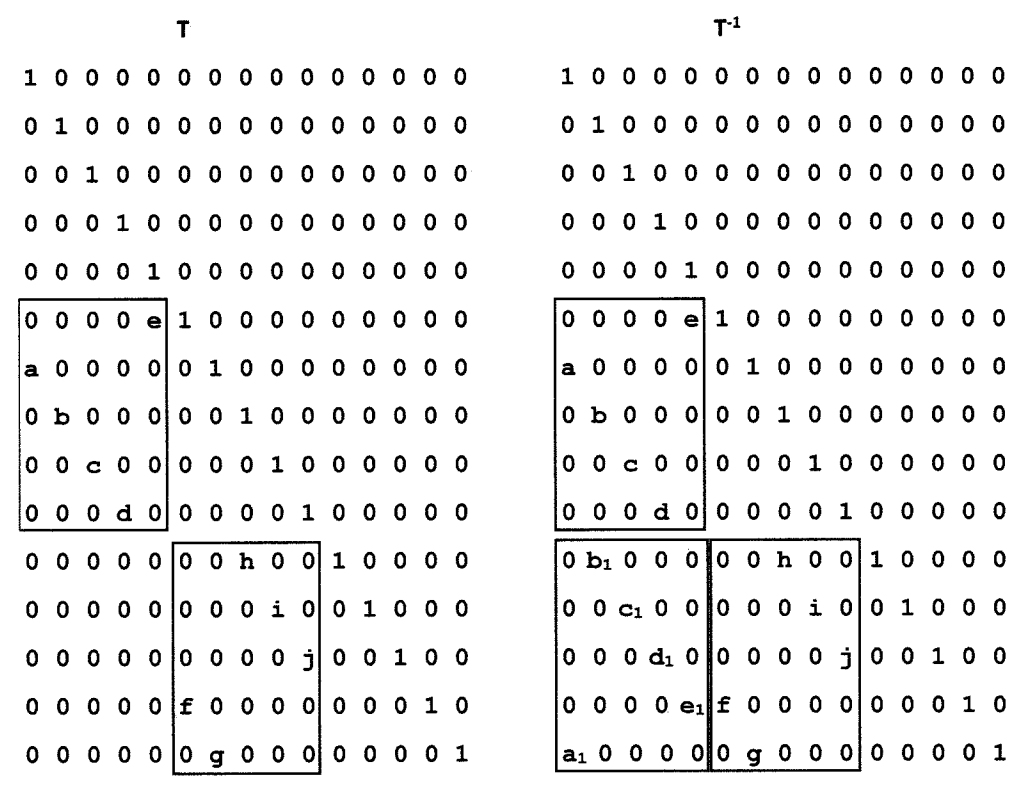

Inputs: T, a (number of root matrix rows), z (submatrix size)
Output: $T^{-1}$
$T^{-1}=T$
for i=2 to (a−2) do
  for j=1 to z(a−i−1) do
    $T^{-1}[(zi)+j, j]=T^{-1}[(z(i-1)+j, j]T^{-1}[(zi)+j, (z(i-1))+j]$
  end for
end for
return $T^{-1}$ Generalized T Inversion When the shift amounts for the non-binary circulant submatrices $I_{T1}$, $I_{T2}$, and $I_{T3}$ are not all zero, an efficient method of inverting T still exists. One example is shown in FIG. 18, with relevant submatrices enclosed in boxes. The 1st submatrix diagonal has boxes around submatrices $I_{T1}$ and $I_{T2}$ that are the same for T and $T^{-1}$ due to the equations in FIG. 19. With $(T)(T^{-1})=I$, the 1st equation shows the inner product of the 7th row of T and the 1st column of $T^{-1}$. The $2^{nd}$ equation shows the inner product of the 8th row of T and the 2nd column of $T^{-1}$. The other equations follow suit. The $2^{nd}$ submatrix diagonal in $T^{-1}$ has non-zero values that are determined by values in 2 submatrices within the 1st diagonal that are above and to the right. The equations in FIG. 20 come from the fact that $(T^{-1})(T)=I$ and start with the inner product of the last row in $T^{-1}$ with the 1st column in T, where g interacts with a. Note that $a_1$ has to be in the 1st column of $T^{-1}$ to interact with 1 in the top left corner of T and cancel out a×g. Therefore, the lower-left submatrix in $T^{-1}$ has a right circular shift of 1. The 2nd equation uses the inner product of the 11th row of $T^{-1}$ with the 2nd column of T, where h interacts with b and this product is countered with $b_1$ interacting with 1 in the 2nd column of T. The other equations follow suit.

Figure 21:
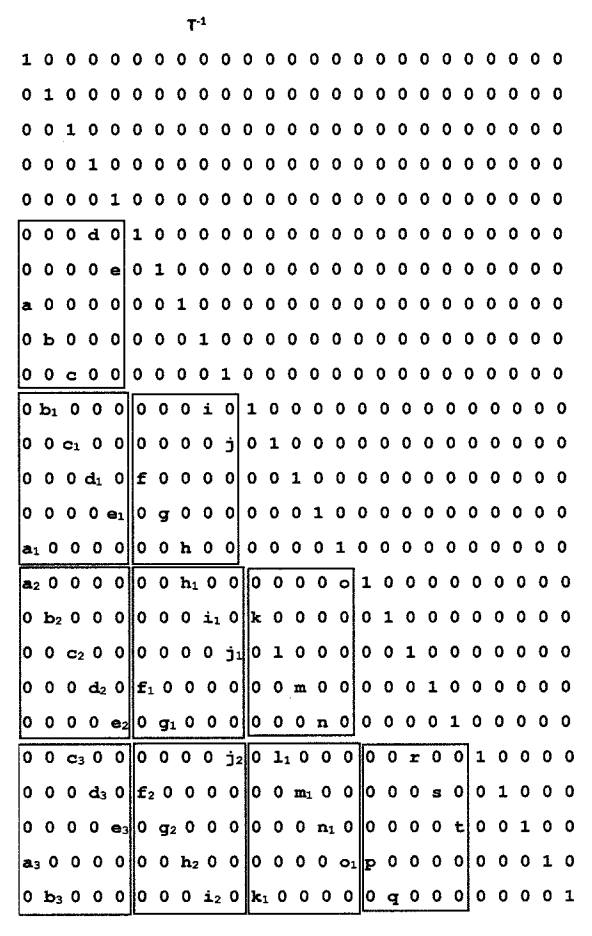

An example with a 6×9 root matrix and a submatrix size, z=5, is shown in FIG. 21. Again, the corresponding matrix has the same values as T on the main diagonal (all 1s) and in the submatrices immediately below the main diagonal. FIG. 22 displays equations that calculate the other non-zero elements in $T^{-1}$. As in FIG. 18, the non-zero elements in the submatrices along the 2nd submatrix diagonal are calculated using elements in the submatrices above and to the right, which are in the 1st submatrix diagonal. The non-zero elements in the submatrices along the 3rd submatrix diagonal are calculated using elements in the submatrix directly above and the submatrix that is 2 submatrices to the right. Calculations for the most lower-left submatrix follow suit, using the submatrix just above and the submatrix 3 submatrices to the right. Observe that $T^{-1}$ is quick and simple to calculate when T is in this specific form.

A pseudocode representation of a method for calculating an inverse of a T matrix (with shifts) is given below.

Inputs: T, a (number of root matrix rows), z (submatrix size)
Output: $T^{-1}$
$T^{-1}$=T
for i=2 to (a−2) do
for j=i to (a−2) do
k=j−i
$r_1$=1; $c_1$=1; u=z(j−1); v=zk
while $T^{-1}$ [u+$r_1$, v+$c_1$]=0 do
$r_1$=$r_1$+1
end while
$r_2$=1; $c_2$=$r_1$; w=zj; x=z(k+i−1)
while $T^{-1}$ [w+$r_2$, x+$c_2$]=0 do
$r_2$=$r_2$+1
end while
for n=1 to z do
$T^{-1}$ [w+$r_2$, v+$c_1$]=$T^{-1}$ [u+$r_1$, v+$c_1$]$T^{-1}$ [w+$r_2$, x+$c_2$]
$r_1$=($r_1$ mod z)+1; $c_1$=($c_1$ mod z)+1
$r_2$=($r_2$ mod z)+1; $c_2$=($c_2$ mod z)+1
end for
end for
end for
return $T^{-1}$ Inverting φ Matrices After $T^{-1}$ is determined, φ can be calculated according to φ=−$ET^{-1}$B+D, which leads to a square z×z matrix. Note that when a pair of circularly shifted diagonal matrices are multiplied, the product is a shifted diagonal matrix whose shift is the sum of the shifts of the 2 multiplier matrices, modulo z. A 5×5 example is shown in FIG. 23. X has a right circular shift of $f_x$=1 while Y has a right circular shift of $f_y$=2. Element a in the 1st row of X is in the ($f_x$+1)th column. It will interact with the non-zero element in the ($f_x$+1)th row of Y. This element, g, is in the [($f_x$+$f_y$+1) mod z]th column. Thus, the 1st row of XY is ag and is located in the [($f_x$+$f_y$) mod z]th column. The other non-zero elements follow suit.

A pseudocode representation of a method for calculating a product of an X matrix and a Y matrix is given below.

Inputs: X, Y, $f_x$ (shift of matrix X), $f_y$, (shift of matrix Y)
Output: Z=XY
$c_X$=$f_x$ mod z
$c_{XY}$=($f_x$+$f_y$) mod z
for i=1 to z do
Z[i, $c_{XY}$+1]=X[i, $c_X$+1]Y [$c_X$+1, $c_{XY}$+1]
$c_X$=($c_X$+1) mod z
$c_{XY}$=($c_{XY}$+1) mod z
end for
return Z The submatrices calculated in FIGS. 21 and 22 follow the shape of matrix multiplication. For example, the highlighted submatrix in FIG. 21 at the far left and third from the bottom is a shifted diagonal matrix whose shift is the sum of the shifts of the submatrices above (submatrix $I_{T1}$ with shift $f_{T1}$) and to the right (submatrix $I_{T2}$ with shift $f_{T2}$), modulo z. The submatrix directly below (second from the bottom) is a shifted diagonal matrix whose shift is the sum of the shifts of the submatrix just above, and the submatrix two to the right, $I_{T2}$ with shift $f_{T3}$, modulo z. Following this logic, the z×z, shifted diagonal submatrix at the bottom left corner of $T^{-1}$ has a shift that is $$\left(\sum_{i=1}^{a-2} f_{Ti}\right)$$

mod z where a is the number of rows in the root matrix.

Note that the matrix −$ET^{-1}$ is z×(a−1)z and is composed of (a−1) shifted diagonal submatrices. The leftmost submatrix has shift $$\left(f_{E1} + \sum_{i=1}^{a-2} f_{Ti}\right)$$

mod z, where $f_{E1}$ is the circular shift of submatrix $I_{E1}$. Also, −$ET^{-1}$B is a z×z shifted diagonal matrix with shift $$\left(f_{B1} + f_{E1} + \sum_{i=1}^{a-2} f_{Ti}\right)$$

mod z where $f_{B1}$ is the circular shift of submatrix $I_{B1}$. See FIGS. 24 and 25. If H is to stay as a quasi-cyclic regular matrix with column weight 2 and row weight 3, then D will be a shifted diagonal matrix. If D has the same shift as −$ET^{-1}$B, then φ=−$ET^{-1}$B+D will be a nonsingular shifted diagonal matrix, provided that none of the corresponding non-zero elements in D and −$ET^{-1}$B are equal. If any of these corresponding elements are equal, φ will be singular and another method of calculating the ciphertext (if possible) must be found. If none are equal, then calculating the inverse of the shifted diagonal φ matrix is simple: replace every non-zero element in the matrix with its GF(q) multiplicative inverse and then take the transpose of this new matrix.

Multiplicative inverses can be implemented with small LUTs. A 5×5 example is given in FIG. 26. Zero has no multiplicative inverse. This is why equality of corresponding non-zero elements in D and −$ET^{-1}$B, which leads to 0s along the shifted diagonal, is to be avoided. Therefore, this procedure is not suitable for GF(2) arithmetic since the only non-zero element is 1. If D has a different shift from −$ET^{-1}$B, then φ will have 2 diagonals with different shifts and could be nonsingular. However, calculating its inverse may be complicated when z is large. Therefore, this effort focuses on D having the same shift as −$ET^{-1}$B and setting non-zero values in D to be different from the corresponding values in −$ET^{-1}$B.

Depending on the embodiment, certain acts, events, or functions of any of the methods described herein can be performed in a different sequence, can be added, merged, or left out altogether. Not all described acts or events are necessarily required for the practice of any claimed method. Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and steps described in connection with the embodiments disclosed herein can be implemented as electronic hardware, computer software, or combinations of both. To clearly illustrate this interchangeability of hardware and software, various illustrative components, block, modules, and steps have been described above generally in terms of their functionality. Whether such functionality is implemented as hardware or software depends on the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method or process described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, a DVD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that may not provide all of the features and benefits set forth herein, as some features can be used or practiced separately from others. The scope of the invention is indicated by the appended claims rather than the foregoing description. All changes which come within the meaning and range of equivalency of the claims are to be embraced within their scope.

I claim:

1. A method of transmitting a message securely over a channel, the method comprising:
for each data block s of the message:
generating a binary root matrix;
generating a quasi-cyclic matrix H based on the binary root matrix;
encoding the data block s using the quasi-cyclic matrix H, to create a punctured codeword; and
transmitting the punctured codeword over the channel;
wherein:
for each data block s, the binary root matrix consists of three submatrices, the submatrices including a first n×n identity matrix located in an upper-left-hand portion of the binary root matrix, a second n×n identity matrix located in a lower-left-hand portion of the binary root matrix, and a 2n×2n circulant matrix located in a right-hand portion of the binary root matrix, the 2n×2n circulant matrix being equal to the sum of 1) a 2n×2n identity matrix, and 2) a 2n×2n identity matrix with all rows circularly shifted to the right by 1; and
generating the quasi-cyclic matrix H comprises expanding the binary root matrix by:
replacing each 0 element in the binary root matrix by a z×z square matrix with all 0 elements; and
replacing each 1 element in the binary root matrix by a z×z square shifted diagonal matrix having a shift value and having exactly z non-zero elements;
wherein the exactly z non-zero elements of the shifted diagonal matrix are selected from $GF(q)$.

2. A method in accordance with claim 1, wherein the quasi-cyclic matrix H comprises a matrix T, wherein the matrix T comprises:
a 2n−1×2n−1 array of z×z square matrices, wherein:
the 2n−1 z×z matrices on a diagonal of the array are z×z identity matrices;
the 2n−2 z×z matrices directly below the 2n−1 z×z matrices on the diagonal of the array are z×z shifted diagonal matrices each with exactly z non-zero elements in $GF(q)$; and
all other z×z matrices in the 2n−1×2n−1 array of z×z square matrices are all-zero matrices.

3. A method in accordance with claim 2, wherein encoding the data block s using the quasi-cyclic matrix H includes:
generating a matrix $T^{-1}$, where $T^{-1}$ is an inverse of the matrix T, wherein
generating the matrix $T^{-1}$ comprises:
setting a matrix $T_2$ equal to T;
repeating, until no z×z zero matrices remain in $T_2$ below the z×z matrices on the diagonal of $T_2$, the steps of:
selecting a z×z zero matrix M having row index a and column index b, the zero matrix being directly below a z×z non-zero matrix N in $T_2$;
for each column m in the non-zero matrix N:
determining a row n where a non-zero element appears in column m of matrix N;
determining a row $n_1$ of column n of the z×z matrix $N_1$ at row index a, column index a−1, where a non-zero element appears;
multiplying the non-zero element from row n in column m of the non-zero matrix N by the non-zero element from column n of the matrix $N_1$ to generate a value v; and
setting the element of matrix M at row $n_1$ column m equal to v; and
setting the matrix $T^{-1}$ equal to $T_2$.

4. A method in accordance with claim 1, wherein the method further comprises generating at least one pseudorandom seed value; and Initializing at least one pseudorandom number generator based on the at least one pseudorandom seed value.

5. A method in accordance with claim 4, wherein the binary root matrix is generated based on output of the at least one pseudorandom number generator.

6. A method in accordance with claim 4, wherein the shift value corresponding to at least one z×z square shifted diagonal matrix is selected based on output of the at least one pseudorandom number generator.

7. A method in accordance with claim 4, wherein at least one of the exactly z non-zero elements of at least one shifted diagonal matrix are selected from GF(q) based on outputs of the at least one pseudorandom number generator.

\* \* \* \* \*